United States Patent [19]
Rodgers et al.

[11] 3,934,475
[45] Jan. 27, 1976

[54] CAPACITANCE TYPE MATERIAL LEVEL DETECTOR FOR HOPPERS

[75] Inventors: Earl Edward Rodgers, Des Plaines; Gerald Allen Mellinger, Libertyville, both of Ill.

[73] Assignee: United Conveyor Corporation, Deerfield, Ill.

[22] Filed: Aug. 9, 1974

[21] Appl. No.: 496,134

[52] U.S. Cl.............. 73/304 C; 15/250.19; 307/118; 317/246
[51] Int. Cl.².....................G01F 23/26; H01G 5/20; H01H 35/18
[58] Field of Search................ 15/250.19; 73/304 C; 307/118; 317/246

[56] References Cited
UNITED STATES PATENTS

| | | | |
|---|---|---|---|
| 2,187,876 | 1/1940 | Ericson | 15/250.19 |
| 2,955,466 | 10/1960 | Coles | 73/304 C X |
| 2,994,034 | 7/1961 | Kinzer | 324/41 |
| 3,037,165 | 5/1962 | Kerr | 317/246 X |
| 3,089,338 | 5/1963 | Glasgow | 73/224 |
| 3,392,349 | 7/1968 | Bartley | 73/304 C X |
| 3,436,059 | 4/1969 | Donaldson | 259/108 |
| 3,467,860 | 9/1969 | Trischberger | 317/246 X |
| 3,831,069 | 8/1974 | Merrell et al. | 317/246 |
| R27,829 | 12/1973 | Tiffany | 307/118 |

*Primary Examiner*—Richard C. Queisser
*Assistant Examiner*—Frederick Shoon
*Attorney, Agent, or Firm*—Wegner, Stellman, McCord, Wiles & Wood

[57] ABSTRACT

A capacitance type material level detector for a hopper for particulate solid materials has a support that extends through an opening in a hopper sidewall to carry a detector unit for which it provides a hood. An electrically conductive sensor member of the detector unit is protected from contact with material in the hopper by a dielectric shield, and is sealed in a chamber defined by the shield and a mounting plate. A manually slidable and rotatable paddle hangs alongside the shield where it may be swung in front of the shield to check operativeness of the detector unit; and by moving the paddle rearwardly it may be used to break accumulated material off the face of the shield.

10 Claims, 2 Drawing Figures

CAPACITANCE TYPE MATERIAL LEVEL DETECTOR FOR HOPPERS

BACKGROUND OF THE INVENTION

Capacitance type material detectors are well known as means for detecting the level of material in a hopper or bin, and their use in hoppers for particulate solid material is well established. An electrode in a support housing is inserted in the hopper wall, and the electrode and the hopper wall create an effective capacitance device. The capacitance value is a function of the presence or absence of material in the hopper, and is measured by a remotely located current sensing circuit which may be conveniently termed a capacitance unit. Such units are commercially available from several sources. The particular detector structure here disclosed has been used with a capacitance unit supplied by Robertshaw Controls.

Prior art capacitance type material level detectors have certain deficiencies which are eliminated by the apparatus of the present invention. We have learned that variations in moisture content or chemical composition of the stored material can produce deceptive readings by varying the capacitance value even though the same amount of material is in the hopper. The present invention eliminates this problem.

In addition, existing systems lack any simple means of checking to determine whether the device is functioning; and the present invention provides such means.

In addition, certain types of particulate material such as very fine powders can accumulate on the face of the detector unit and cause a false indication of the presence of material. The apparatus for verifying the functioning of the device is so arranged that it may also be used to break accumulated material from the face of the detector unit.

SUMMARY OF THE INVENTION

The principal object of the present invention is to provide an improved capacitance type material level detector for material hoppers. The apparatus is particularly useful in hoppers for the handling and storage of particulate solid materials, and most especially fine powders or ash which can collect on the forward face of the detector unit.

Another object of the invention is to provide a capacitance type material level detector in which the electrically conductive sensor member of a detector unit is protected from contact with material in the hopper by a dielectric shield, so that variations in moisture content and chemical composition of the material cause less effect upon capacitance value than is the case where there is direct contact between the material and the sensor element.

The detector unit is carried in a support which fits in a complementary opening in a hopper wall and which is so arranged that differences in hopper sidewall angle have no effect upon orientation of the detector unit with reference to a vertical plane. In addition, the upper portion of the support means provides a hood wich protects the detector unit from damage by material pouring into the hopper.

Finally, a rod which is rotatably and slidably mounted in the support carries a paddle which hangs alongside the detector unit, and a handle on the rear end of the rod permits the paddle to be swung back and forth and also moved forwardly and rearwardly with respect to the detector unit. Manual rotation of the paddle confirms the presence or absence of material in front of the detector unit; and if no material is present the positioning of the paddle in front of the detector unit causes a change in the capacitance level if the unit is functioning properly.

In addition, by swinging the paddle to its position in front of the detector unit and moving the mounting rod outwardly until the paddle is nearly in contact with the dielectric shield of the sensor unit, any material which may have accumulated upon the face of the shield can be broken up so it falls off.

THE DRAWINGS

FIG. 1 is a front elevational view of the apparatus mounted in a hopper wall; and FIG. 2 is a vertical central sectional view taken substantially as indicated along the line 2—2 of FIG. 1 with a remotely located capacitance unit being diagrammatically illustrated as electrically connected to the detector unit.

DETAILED DESCRIPTION OF THE INVENTION

Figure 1:
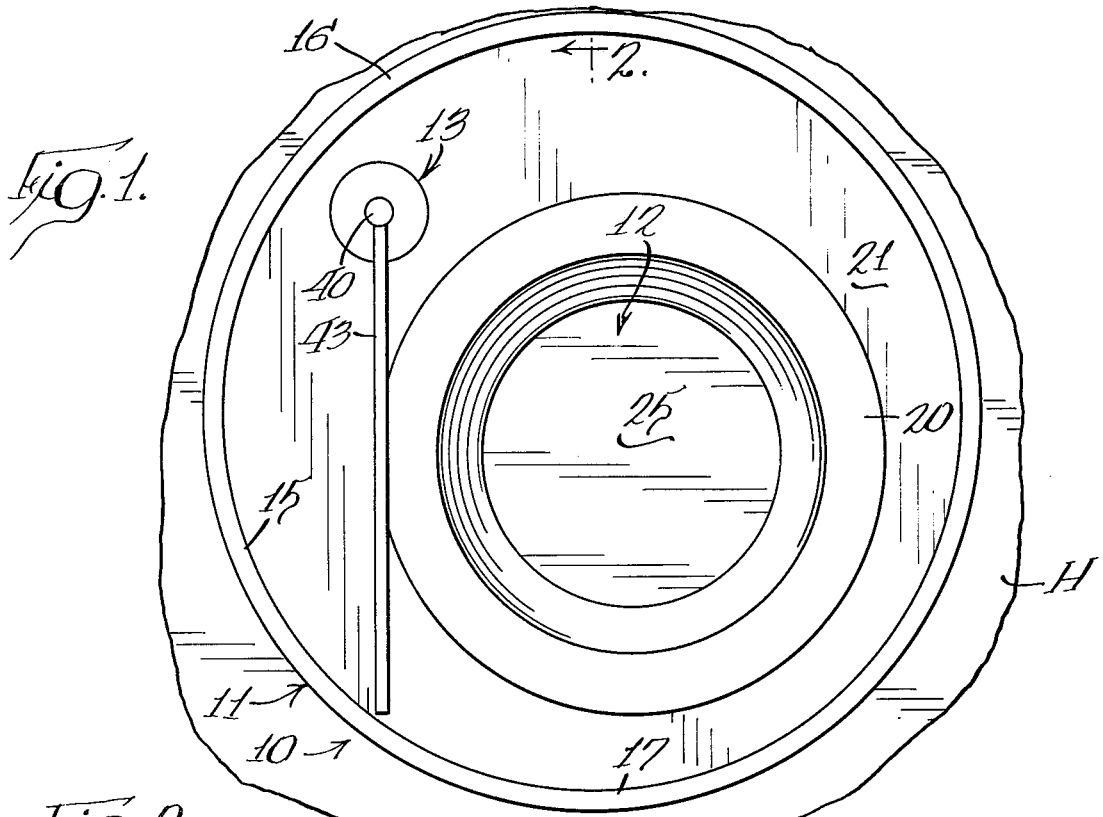
Figure 2:
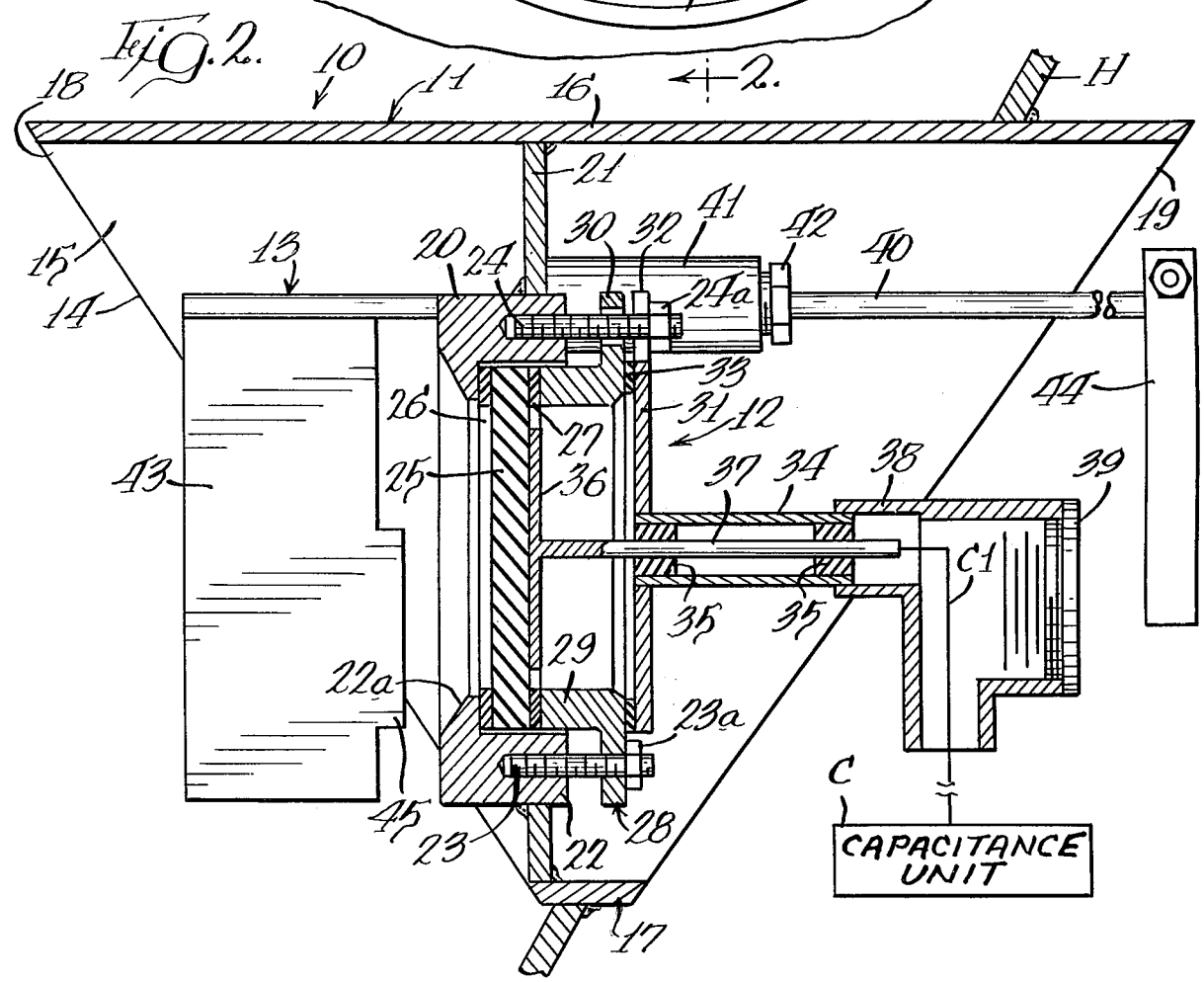

The material level detector means of the present invention, indicated generally at 10, is illustrated as mounted in an opening in an inclined sidewall H of a hopper. The apparatus includes support means, indicated generally at 11, a detector unit, indicated generally at 12, and manually manipulable detector checking and cleaning means, indicated generally at 13.

The support means 11 includes a section 14 of steel pipe which affords a principal support member that is welded in the wall H with the pipe axis horizontal. This pipe provides a continuous sidewall 15 which is tapered from a long upper end 16 to a short lower end 17 and has open ends 18 and 19. An annular frame 20 is welded in an external web 21 by means of which it is welded into the pipe in a plane normal to the longitudinal pipe axis. The frame 20 includes a peripheral body 22 in which there are rearwardly extending short studs such as the stud 23, and rearwardly extending long studs such as the stud 24; and said studs provide the elements upon which the detector unit 12 is mounted.

The detector unit 12 includes a dielectric shield 25 which may conveniently be a slab of glass about ½ inch thick, and there are gaskets 26 and 27 positioned on the front and rear faces, respectively, of the shield. A clamping ring 28 has a forwardly extending flange 29 which abuts the gasket 27, and a radially projecting rim 30 is provided with holes which are impaled by the short studs 23 which are threaded to receive nuts 23a by means of which the clamping ring 28 is firmly secured to the frame 20 and forces the gasket 26 against the rear of an internal flange 22a of the frame 20.

The detector unit 12 also includes a mounting plate 31 provided with ears 32 which are impaled by the threaded long studs 24 so that a pair of nuts 24a may be used to connect the plate 31 to the frame 20 with a gasket 33 providing an airtight connection between the mounting plate 31 and the clamping ring 28. A rearwardly extending tube 34 on the mounting plate 31 is provided with internal, annular plugs 35 so that an electrically conductive sensor disc 36 may be supported in the plugs by means of an integral stem 37 which also serves to make an electrical connection with a capacitance unit C through a cable C1 which is connected to the stem 37 in a condulet 38 which screws onto the rear end of the tube 34 and is provided with a cap 39.

The detector checking and cleaning means 13 includes a rod 40 which is rotatable and slidably mounted in a sleeve 41 which is welded to the support web 21 and thus forms a part of the support means. Sleeve 41 is filled with standard commercially available packing and has a packing gland 42 so that the mounting of the rod 40 is air tight. As best seen in FIG. 1, the position of the rod 40 with respect to the frame 20 is such that a paddle 43 which is mounted on the inner end of the rod hangs alongside the frame. At the rear end of the rod 13 is a handle 44 by means of which the rod may conveniently be rotated to swing the paddle 43 back and forth, and by which the rod may also be moved endwise. If the paddle 43 can be swung freely, of course, it indicates that there is no material in the hopper at the height of the paddle. Further, by swinging the paddle into the area in front of the shield 25 an operator can determine whether the apparatus is functioning. If the material level detector is showing the presence of material at the detector level when swinging the paddle 43 shows that there is no material in that area, the commonest reason is an accumulation of material on the front of the shield 25. When this occurs, the paddle 43 may be swung to a position in front of the shield and then drawn rearwardly so that the rearwardly projecting portion 45 of the paddle may extend into the opening of the frame 20 and break up the accumulated material as the paddle is oscillated by the operator.

Very finely divided materials such as certain chemicals in powder form, or fly ash from a high efficiency coal burning furnace, can form a substantial buildup on the face of the shield 25 in spite of the fact that the detector unit 12 is recessed beneath the projecting forward end of the upper side 18 of the pipe, since the rise in material level as the hopper is filled can result in material entering the area beneath the overhanging upper portion of the pipe.

The foregoing detailed description is given for clearness of understanding only and no unnecessary limitations should be understood therefrom, as modifications will be obvious to those skilled in the art.

We claim:

1. Material level detector means for a hopper comprising, in combination:
 a support having a closed sidewall and open ends, said support being mounted in a complementary opening in a hopper sidewall, and said support sidewall having an upper portion that projects into the hopper;
 an annular frame which is in a plane substantially normal to the support sidewall, said frame having a continuous, peripheral web by which it is mounted in said support sidewall recessed beneath said projecting upper portion of the support sidewall;
 and a detector unit mounted in said frame, said detector unit including,
 a dielectric shield which has its periphery sealed to the frame, said shield having a forward face toward the material and a rear face toward the exterior of the hopper,
 an electrically conductive sensor member adjacent the rear face of the shield, said sensor member having a stem adapted to be electrically connected to a capacitance unit,
 and a mounting plate spaced rearwardly from the sensor member, said mounting plate and shield cooperating to encase the sensor member, and there being an opening in the mounting plate through which the stem projects.

2. The combination of claim 1 which includes a clamping ring and means sealing the clamping ring to the shield and to the mounting plate.

3. The combination of claim 1 in which the sensor member is in surface abutting relationship to the shield.

4. The combination of claim 1 which includes manually manipulable detector checking and cleaning means comprising a paddle which hangs alongside the frame on a rotatable and slidable rod that extends through the web, said paddle being positioned and arranged to be swung into the area in front of the shield by rotation of the rod and to break accumulated material from within the frame by sliding the rod rearwardly.

5. Material level detector means for a hopper comprising, in combination:
 a detector unit including,
 a dielectric shield having a forward face and a rear face,
 an electrically conductive sensor member adjacent the rear face of the shield, said sensor member being adapted to be electrically connected to a capacitance unit,
 and a mounting plate spaced rearwardly from the sensor member, said mounting plate and shield cooperating to encase the sensor member;
 and support means embracing said detector unit and seated in an opening in a hopper sidewall with the forward face of the shield toward the interior of the hopper and substantially vertical, said support means sealing the periphery of said opening and being sealed to the shield.

6. The combination of claim 5 in which the support means includes an annular frame which has an internal flange, and in which the forward face of the shield is peripherally sealed to said flange.

7. The combination of claim 5 which includes manually manipulable detector checking and cleaning means comprising a paddle which hangs alongside the detector unit on a rod that is carried in the support means, said paddle being positioned and arranged to be swung into the area in front of the shield by rotation of the rod and to break accumulated material from the face of the shield by sliding the rod rearwardly.

8. The combination of claim 5 in which the support means includes a forwardly projecting upper wall which extends a substantial distance forward of the plane of the shield which is recessed beneath said upper wall.

9. Material level detector means for a hopper comprising, in combination:
 a detector unit including an electrically conductive sensor member which is adapted to be electrically connected to a capacitance unit;
 support means mounting said detector unit in an opening in a hopper sidewall, said support means sealing the periphery of said opening and being sealed to the detector unit;
 and manually manipulable detector checking and cleaning means comprising a paddle which hangs alongside the detector unit on a rod that is carried in the support means, said paddle being positioned and arranged to be swung into the area in front of the detector unit by rotation of the rod and to break accumulated material from the face of said unit by sliding the rod rearwardly.

10. The combination of claim 9 in which the manually manipulable means includes a sleeve mounted in the support means above and to one side of the detector unit, the rod being slidable and rotatable in the sleeve.

* * * * *